Figure 1:
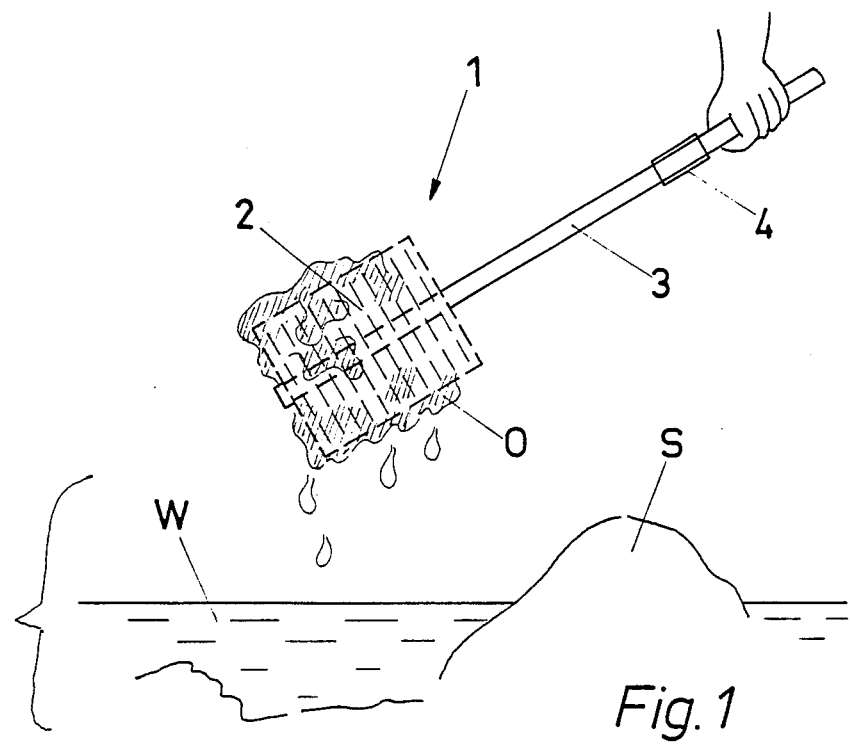

United States Patent [19]

Lundin

[11] Patent Number: 4,760,619
[45] Date of Patent: Aug. 2, 1988

[54] CLEANING-DEVICE COMBINATION FOR CLEANING OIL-CONTAMINATED SHORE WATER AND SHORE AREA

[75] Inventor: Lars Lundin, Porvoo, Finland
[73] Assignee: Oy Lars Lundin Patent Ab, Finland
[21] Appl. No.: 65,215
[22] PCT Filed: Oct. 15, 1986
[86] PCT No.: PCT/FI86/00117
 § 371 Date: Jun. 4, 1987
 § 102(e) Date: Jun. 4, 1987
[87] PCT Pub. No.: WO87/02401
 PCT Pub. Date: Apr. 23, 1987

[30] Foreign Application Priority Data

Oct. 15, 1985 [FI] Finland .................................... 854008

[51] Int. Cl.$^4$ ...................... E01H 12/00; E02B 15/04
[52] U.S. Cl. ...................................... 15/142; 15/104.8
[58] Field of Search ............. 15/38, 104.8, 142, 256.51

[56] References Cited

U.S. PATENT DOCUMENTS

| | | | |
|---|---|---|---|
| 1,913,782 | 6/1933 | Willard | 15/142 X |
| 2,197,869 | 4/1940 | Kramer | 15/142 X |
| 2,576,185 | 11/1951 | MacKenzie | 15/142 |
| 2,623,230 | 12/1952 | Feinen | 15/142 |
| 3,072,939 | 1/1963 | Rehberg | 15/38 |

Primary Examiner—Chris K. Moore
Attorney, Agent, or Firm—Biebel, French & Nauman

[57] ABSTRACT

The invention relates to a cleaning-device combination for cleaning shore water (W) and shore area (S) contaminated by oil (O). The combination comprises at least one brush (1) having an arm and a collecting container (6) having as part of the container or separately a scraper or suchlike for removing the oil adhering to the brush and for directing the oil into the container. The object is to create a combination which as much as possible facilitates and rationalizes this sort of manual cleaning work. The brush of the combination comprises a substantially cylindrical bristled part (2) and an arm (3) centrally secured to it. The cleaning device for the bristled part, fitted in connection with the container (6), comprises on the other hand a mantle part (7) corresponding to the shape of the bristled part, the mantle being intended for receiving the bristled part and having, mounted on a bearing inside it, a scraper blade (9) which pushes between the bristles of the bristled part and, when the brush is being rotated in one direction or when the brush is being pulled out, scrapes oil from the bristles, directing the oil into the container (6). The scraper blade may be saw-blade-like, the pitch of the teeth preferably corresponding to the pitch of the bristles arranged in a ring-like manner. The cleaning device and the container may be common to several operators, i.e. to several brushes.

11 Claims, 2 Drawing Sheets

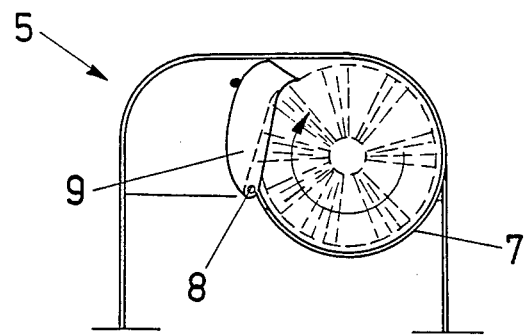
Fig. 3
Fig. 4
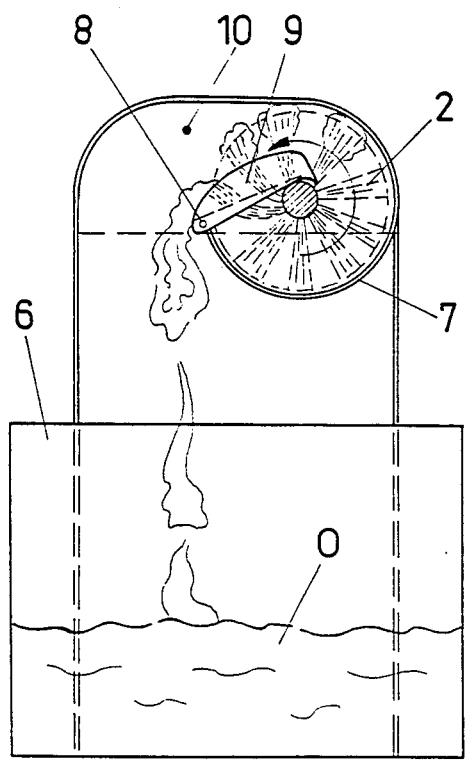
Fig. 5
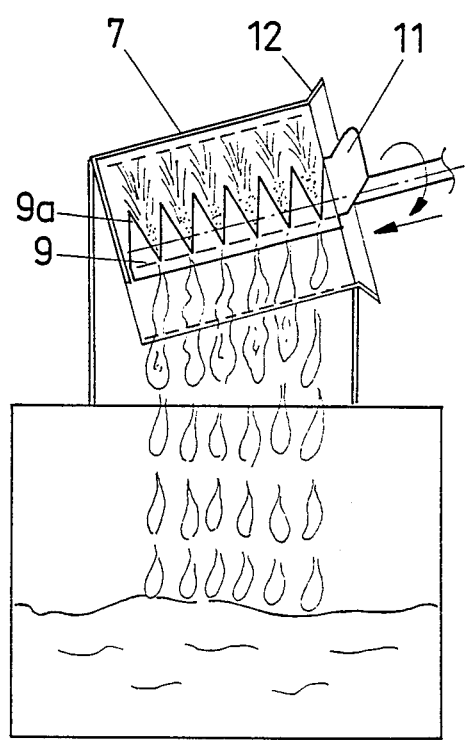

CLEANING-DEVICE COMBINATION FOR CLEANING OIL-CONTAMINATED SHORE WATER AND SHORE AREA

The present invention relates to a cleaning-device combination for cleaning oil-contaminated shore water and shore area, the combination comprising at least one manually operated brush having an arm and a collecting container having as part of the container or separately a scraper or suchlike for removing from the brush the oil adhering to the brush and for directing the oil into the container.

For cleaning a shore area and shore water from oil spills it is known to use spades, brushes and other similar tools to which the oil adheres or by means of which the soil can more or less satisfactorily be skimmed from water surface, from stones and rocks on the shore, etc. When brushes are used it is natural that the brush must betweentimes be continually cleaned, for example by drawing or pressing it against the rim of the collecting container. All known devices are, however, in genrral unsatisfactory with respect to their cleaning efficiency and their capacity, and also with respect to the capability of the collecting member itself to be cleaned rapidly. For this reason the object of the present invention is to provide a combination which is specifically suitable for the said purpose and in which the manual work can be made more effective and can be facilitated as much as possible.

In order to achieve this objective the cleaning-device combination according to the invention is characterized in that the brush comprises a substantially cylindrical bristled part and an arm secured to it centrally in the manner of an axle, and that the cleaning device for the bristled part, mounted in connection with the container, on the other hand comprises a mantle part which substantially corresponds to the outer shape of the bristled part, one end of the cleaning device being open for the pushing in of the brush and there being mounted inside it on a bearing a scraping device which pushes between the bristles of the bristled part, the scraper scraping oil from the bristles and directing the oil into the said container when the brush is being rotated in one direction or when the brush is being pulled out.

The device for cleaning the bristled part is preferably mounted above the collecting container in such a way that the open end of the mantle is directed obliquely upwards. The said open end may slightly widen conically in order to facilitate the pushing in of the bristled part.

The scraper is, in a manner known per se, preferably saw-blade-like and mounted on a bearing on one side of the mantle in such a manner that its teeth push between the bristles of the brush in the peripheral direction, obliquely inwards towards the core of the bristled part. In this case the teeth can be given the shape of a bird's beak so that, when the bristled part is rotated against the teeth, the teeth press inwards towards the core. At the mouth of the mantle part there may be a guide plate adjoining the scraper in such a manner that, when the bristled part is pushed in, this guide plate raises the scraper blade to the periphery of the bristles.

The combination according to the invention preferably comprises a collecting container to be shared by several users, i.e. several brushes, together with a cleaning device.

Figure 2:
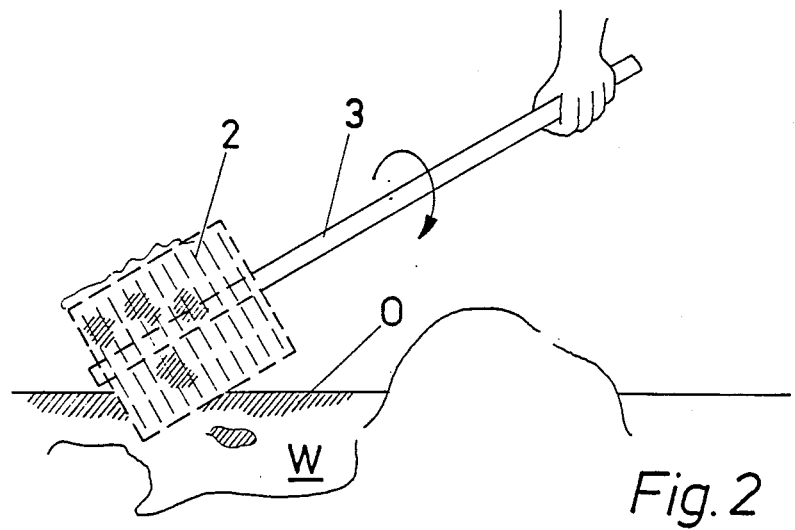

The invention and its other special characteristics and advantages are described below in greater detail in the form of an example and with reference to the accompanying drawings, in which:

FIG. 1 depicts a brush according to the invention, upon having been lifted from water, FIG. 2 depicts a brush according to the invention being used in surface water of a shore area, FIG. 3 depicts schematically a cross section of the cleaning device as seen from the end, FIG. 4 depicts the cleaning device mounted on the collecting container, and FIG. 5 depicts, partially in cross section, the same device as is shown in FIG. 4, but as seen from the side.

The brush belonging to the combination according to the invention is indicated in FIG. 1 by reference numeral 1. It comprises a substantially cylindrical bristled part 2 made of, for example, plastic, the bristles of which are relatively stiff and in a known manner so designed that relatively thick oil easily adheres to them. It is evident that this bristled part 2 may also be somewhat rounded at its ends, or even nearly spherical, without this affecting the idea of the invention. There is centrally secured to the bristled part an arm 3, by means of which the brush can be easily rotated manually. To facilitate the rotating there may further be mounted on the arm a sleeve 4, which the operator holds with one hand. In the figure, shore water is indicated by W, the shore area or rock by S, and the oil by O.

FIG. 2 depicts the brush being used for cleaning shallow shore water W. The arm 3 is directed slantedly downward and the lower bristles of the bristled part 2 extend into the oil layer O on the water surface. The brush is rotated in the oil layer, as indicated by the arrow. A brush of the type depicted has a high capacity and enables different parts of the shore to be reached, for example areas between rocks or stones.

The possibility of cleaning the brush rapidly and effectively is essential for the functioning of the combination. For this purpose the combination includes a cleaning device, which in FIG. 3 is in general indicated by reference numeral 5 and which comprises a mantle part 7 which substantially corresponds to the outer shape of the bristled part 2, the mantle, however, not extending around the entire bristled part 2 but being open on one side, in FIG. 3 on the left side. On this side there is mounted by means of an axial bearing 8 a scraper indicated by 9, which is described below in greater detail.

FIG. 4 depicts how the cleaning device is mounted on the collecting container 6. The cleaning device may be secured to the upper part of the container, or it may be provided with legs of its own and stand on the bottom of the container, as shown in the figure. As can be seen in FIGS. 4 and 5, the scraper blade 9 resembles a saw blade so that its teeth 9a extend to between the bristles of the bristled part 2. As seen from the side, the teeth 9a have been given the shape of a bird's beak so that, when the bristled part 2 is being rotated "against the grain", the scraper blade 9 tends to press towards the core of the bristled part 2. Especially in a case in which the bristles have been set in the bristled part 2 in a ring-like manner and their pitch corresponds to the pitch of the teeth 9a, the cleaning efficiency of the scraper blade is very high, the teeth "snuffing" the bristles between them.

Before the brush is pulled out, it is rotated in the opposite direction, for example about half a round (see arrow in FIG. 3), whereupon the scraper blade rises above the bristles and loose from them.

As can be seen in FIG. 4, the oil O separated from the bristles 2 is directed over the mantle 7 into the container 6.

In order to facilitate the pushing in of the bristled part 2 the open end of the mantle part preferably widens conically, as shown at point 12, whereby the centering of the brush is also facilitated. Furthermore, the front part of the scraper blade 9 is provided with an obliquely extending guide plate 11, which, when the bristled part 2 is being pushed in, raises the scraper blade upwards to the periphery of the bristled part 2, against the stop 10. It is, of course, evident that the scraper blade presented can be varied without deviating from the idea of the invention. From oil-collecting devices there are known per se also cleaning teeth which are conically directed towards one another; such teeth could, for example, in the present case be placed in the area of the mouth of the mantle 7, directed inwards so that these teeth would clean the bristles during the pulling out of the bristled part. Practical experiments have, however, shown that cleaning in the manner shown in the figures, by rotating the bristled part, is relatively light work, which is important when the work is carried out manually.

I claim:

1. A cleaning-device combination for cleaning shore water and shore area contaminated with oil, the combination comprising at least one manually operated brush having an arm, and a collecting container having a scraper for removing from the brush the oil adhering to the brush and for directing the oil into the container; wherein the brush comprises a substantially cylindrical bristled part and an arm centrally secured to it in the manner of an axle, and that the cleaning device for the bristled part, mounted in connection with the container, on the other hand comprises a mantle part which is open at one end and substantially corresponds to the outer shape of the bristeld part and inside which there is mounted on a bearing a scraper part which pushes between the bristles of the bristled part and, when the brush is being rotated in one direction or when the brush is being pulled out, scrapes oil from the bristels, directing the oil into said container.

2. The combination of claim 1 wherein the cleaning device for the bristled part is mounted above the collecting container with the open end of the mantle directed obliquely upwards.

3. The combination of claim 2 wherein the open end of the mantle widens conically.

4. The combination of claim 3, wherein said scraper part comprises a scraper blade, said blade being sawblade-like, the teeth of said scraper blade pushing between said bristles of said brush in the peripheral direction but obliquely inwards towards the core of said bristled part.

5. The combination of claim 2 wherein said scraper part comprises a scraper blade, said blade being sawblade-like, the teeth of said scraper blade pushing between said bristles of said brush in the peripheral direction but obliquely inwards towards the core of said bristled part.

6. The combination of claim 1 wherein the scraper part comprises a scraper blade, said blade being sawblade-like, the teeth of the blade pushing between the bristles of the brush in the peripheral direction but obliquely inwards towards the core of the bristled part.

7. The combination of claim 6 wherein the scraper blade is mounted on a bearing on one side of the mantle so that the teeth come above the core of the bristled part which has been pushed in.

8. The combination of claim 7 wherein the tip part of the teeth of the scraper blade is shaped like a bird's beak, curving downwards, so that, when the brush is being rotated against the teeth, the bristles tend to press the teeth of the scraper blade towards the core of the brush and, when the brush is being rotated in the opposite direction, the scraper blade rises above the bristles, facilitating the pulling out of the brush.

9. The combination of claim 7 wherein the front part of the scraper blade is adjoined by an oblique guide plate, which, when the brush is being pushed inside the mantle, first raises the scraper blade to the area of the tips of the bristles.

10. The combination of claim 1 wherein the arm of the brush is provided at least at one point with a slide sleeve fitted over the arm, which sleeve the operator can hold with one hand when rotating the brush.

11. The combination of claim 1 wherein it comprises a common collecting container for several brushes, together with a cleaning device.

* * * * *